United States Patent
Tanaka et al.

(10) Patent No.: US 12,403,422 B2
(45) Date of Patent: Sep. 2, 2025

(54) $CO_2$ RECOVERY UNIT AND $CO_2$ RECOVERY METHOD (71) Applicants: MITSUBISHI HEAVY INDUSTRIES, LTD., Tokyo (JP); The Kansai Electric Power Co., Inc., Osaka (JP)

(72) Inventors: Hiroshi Tanaka, Tokyo (JP); Takuya Hirata, Tokyo (JP); Tatsuya Tsujiuchi, Tokyo (JP); Takashi Kamijo, Kanagawa (JP); Shimpei Kawasaki, Kanagawa (JP)

(73) Assignees: Mitsubishi Heavy Industries, Ltd., Tokyo (JP); The Kansai Electric Power Co., Inc., Osaka (JP)

( * ) Notice: Subject to any disclaimer, the term of this patent is extended or adjusted under 35 U.S.C. 154(b) by 583 days.

(21) Appl. No.: 17/915,804

(22) PCT Filed: Jan. 13, 2021

(86) PCT No.: PCT/JP2021/000852
§ 371 (c)(1),
(2) Date: Sep. 29, 2022

(87) PCT Pub. No.: WO2021/199567
PCT Pub. Date: Oct. 7, 2021

(65) Prior Publication Data
US 2023/0191314 A1    Jun. 22, 2023

(30) Foreign Application Priority Data
Apr. 2, 2020 (JP) .................................. 2020-066881

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1406* (2013.01); *B01D 53/1418* (2013.01);
(Continued)

(58) Field of Classification Search
CPC ............ B01D 53/1425; B01D 53/1406; B01D 53/1418; B01D 53/18; B01D 53/62;
(Continued)

(56) References Cited

U.S. PATENT DOCUMENTS

| 4,487,748 A | 12/1984 | Onojima et al. |
| 2011/0041685 A1 | 2/2011 | Tanaka et al. |

(Continued)

FOREIGN PATENT DOCUMENTS

| CN | 101070275 A | 11/2007 |
| CN | 101735025 A | 6/2010 |

(Continued)

OTHER PUBLICATIONS

Extended European Search Report in corresponding European Application No. 21780193.5, dated May 10, 2023 (8 pages).

*Primary Examiner* — Daniel C. McCracken
*Assistant Examiner* — Joshua Maxwell Speer
(74) *Attorney, Agent, or Firm* — Osha Bergman Watanabe & Burton LLP (57) ABSTRACT

A $CO_2$ recovery unit includes a $CO_2$ absorber that brings a gas having a low $CO_2$ concentration into countercurrent contact with a $CO_2$ absorbent to remove $CO_2$ from the gas. The $CO_2$ recovery unit further includes a first absorbent circulation line that supplies a $CO_2$ absorbent from a first $CO_2$ absorption section as a first circulation solution to an upper side of a first $CO_2$ absorption section; a second absorbent circulation line that supplies a $CO_2$ absorbent from a second $CO_2$ absorption section as a second circulation solution to an upper side of a second $CO_2$ absorption (Continued)

section; and an absorbent discharge line that discharges a part of the first circulation solution from the first absorbent circulation line and supply the part of the first circulation solution as a discharged solution to the second absorbent circulation section.

6 Claims, 9 Drawing Sheets

(51) Int. Cl.
  *B01D 53/62* (2006.01)
  *B01D 53/78* (2006.01)
(52) U.S. Cl.
  CPC .............. *B01D 53/18* (2013.01); *B01D 53/62* (2013.01); *B01D 53/78* (2013.01); *B01D 2252/20478* (2013.01); *B01D 2257/504* (2013.01)
(58) Field of Classification Search
  CPC .......... B01D 53/78; B01D 2252/20478; B01D 2257/504; B01D 53/1475; Y02C 20/40; Y02P 20/10; Y02P 20/151; C01B 32/50
  See application file for complete search history.

(56) References Cited

U.S. PATENT DOCUMENTS

| | | |
|---|---|---|
| 2011/0120309 A1 | 5/2011 | Baburao et al. |
| 2013/0251601 A1 | 9/2013 | Baburao et al. |
| 2014/0245888 A1* | 9/2014 | Tsujiuchi ............... B01D 53/62 95/180 |
| 2019/0232215 A1 | 8/2019 | Fujita et al. |

FOREIGN PATENT DOCUMENTS

| | | |
|---|---|---|
| EP | 2327467 A1 | 6/2011 |
| EP | 2767327 A1 | 8/2014 |
| JP | 2016-112497 A | 6/2016 |
| WO | 2009-104744 A1 | 8/2009 |

* cited by examiner

$CO_2$ RECOVERY UNIT AND $CO_2$ RECOVERY METHOD

FIELD

The present invention relates to a $CO_2$ recovery unit and a $CO_2$ recovery method.

BACKGROUND

Various methods have been proposed so far to recover and remove acid gases, especially $CO_2$, contained in flue gases from boilers, for example. One of such methods is to bring $CO_2$ into contact with a $CO_2$ absorbent made of an amine aqueous solution to remove and recover $CO_2$ contained in the flue gases.

For example, the method involves use of the $CO_2$ absorbent in a $CO_2$ absorber to absorb $CO_2$ contained in the flue gases for removal of $CO_2$ from the flue gases, followed by regeneration of the $CO_2$ absorbent by releasing $CO_2$ absorbed in the $CO_2$ absorbent and regenerate the $CO_2$ absorbent in a regenerator, and circulation of the regenerated $CO_2$ absorbent into the $CO_2$ absorber for reuse of the $CO_2$ absorbent to remove $CO_2$ from the flue gases again. The $CO_2$-absorbing $CO_2$ absorbent is heated in the regenerator with use of steam flowed from a reboiler to release $CO_2$ for recovery of $CO_2$ at a high purity. In this method, it is proposed that a part of the $CO_2$ absorbent is discharged at a lower part and returned to at least one portion(s) between an upper $CO_2$ absorbent supply part and a lower gas supply part in the $CO_2$ absorber to increase an amount of $CO_2$ absorbed from the flue gas while reducing a reboiler heat duty required for the regeneration of the $CO_2$ absorbent (for example, Patent Literature 1). It is proposed that the $CO_2$ absorber is provided at its absorption section with a plurality of stages to allow a part of a discharged solution to be returned to an upper side above a position for discharging a circulated solution at the lower stage in the absorption section to increase the amount of $CO_2$ absorbed from the flue gas while reducing an energy required for the regeneration of the $CO_2$ absorbent, as well (for example, Patent Literature 2).

CITATION LIST

Patent Literature

Patent Literature 1: Japanese Translation of PCT Application Publication No. 2013-512088
Patent Literature 2: International Publication No. 09/104744

SUMMARY

Technical Problem

However, the current $CO_2$ recovery unit has a problem of requiring a large amount of heat in reboiling for reuse of a $CO_2$ absorbent because of difficulties in $CO_2$ release at a $CO_2$ regenerator and reduction of steam energy required for regeneration of the $CO_2$ absorbent.

Furthermore, although the $CO_2$ content in a flue gas is 10 to 15% by volume (represented simply by "%", hereinafter), there is a demand for a $CO_2$ recovery unit and a $CO_2$ recovery method that are capable of reducing the amount of heat in reboiling for the reuse of the $CO_2$ absorbent even when $CO_2$ is recovered from gases under nearly atmospheric pressure containing a subtle amount of $CO_2$ other than the flue gas as well as a variety of gases with low $CO_2$ contents in gases having $CO_2$ concentrations of 10% or less flowed from gas turbine gas and the like, for example.

In light of the aforementioned circumstances, the present invention has an object to provide a $CO_2$ recovery unit and a $CO_2$ recovery method that are capable of reducing an amount of heat in reboiling for reuse of a $CO_2$ absorbent to recover $CO_2$ from a variety of gases with low $CO_2$ contents.

Solution to Problem

A $CO_2$ recovery unit according to a first aspect of the present invention includes: a $CO_2$ absorber that brings a gas having a low $CO_2$ concentration into countercurrent contact with a $CO_2$ absorbent to remove $CO_2$; an absorbent regenerator that performs a heat exchange between a rich solution containing absorbed $CO_2$ and water vapor flowed from a reboiler to regenerate the $CO_2$ absorbent; a rich solution supply line that discharges a rich solution containing absorbed $CO_2$ from a bottom part of the $CO_2$ absorber and supplies the rich solution to an upper side of the absorbent regenerator; and a lean solution supply line that discharges a lean solution obtained by releasing $CO_2$ from a bottom part of the absorbent regenerator and supplies the lean solution to an upper side of the $CO_2$ absorber. The $CO_2$ absorber includes a $CO_2$ absorption section with at least two or more stages. The $CO_2$ recovery unit further includes: absorbent circulation lines that each discharge the $CO_2$ absorbent from a lower side of one of the stages in the $CO_2$ absorption section and supply the $CO_2$ absorbent as a circulation solution to an upper side of the corresponding stage used for the discharge in the $CO_2$ absorption section; and an absorbent discharge line that discharges a part of the circulation solution from the absorbent circulation line and supply the part of the circulation solution as a discharged solution to a stage immediately below the stage used for the discharge.

A $CO_2$ recovery method according to a second aspect of the present invention includes: a $CO_2$ absorption step of bringing a gas having a low $CO_2$ concentration into countercurrent contact with a $CO_2$ absorbent to remove $CO_2$; an absorbent regeneration step of performing a heat exchange between water vapor and a rich solution containing the absorbed $CO_2$ to regenerate the $CO_2$ absorbent; and a step of discharging a rich solution containing $CO_2$ that is absorbed at the $CO_2$ absorption step, supplying the rich solution to the absorbent regeneration step, discharging a lean solution that is obtained by releasing $CO_2$ from a tower bottom part at the absorbent regeneration step, and supplying the lean solution to the $CO_2$ absorption step to recover $CO_2$ in the gas. The $CO_2$ absorption step includes an absorbent circulation step of, in a $CO_2$ absorption section with at least two or more stages, discharging the $CO_2$ absorbent from lower sides of the stages in the $CO_2$ absorption section and supplying the $CO_2$ absorbent as a circulation solution to upper sides of the corresponding stages used for the discharge in the $CO_2$ absorption section; and an absorbent discharge step of discharging a part of the circulation solution from the absorbent circulation step and supplying the part of the circulation solution as a discharged solution to a stage immediately below the stage used for the discharge.

Advantageous Effects of Invention

According to the present invention, an amount of heat can be reduced in reboiling for $CO_2$ recovery to recover $CO_2$ from a variety of gases with low $CO_2$ contents.

DESCRIPTION OF EMBODIMENTS

Hereinafter, preferred embodiments of the present invention are described in detail with reference to the accompanying drawings. The present invention is not limited to these embodiments, and modifications, additions, and omissions can be made by a person skilled in the art without departing from the spirit and scope stated in the claims.

First Embodiment

Figure 1:
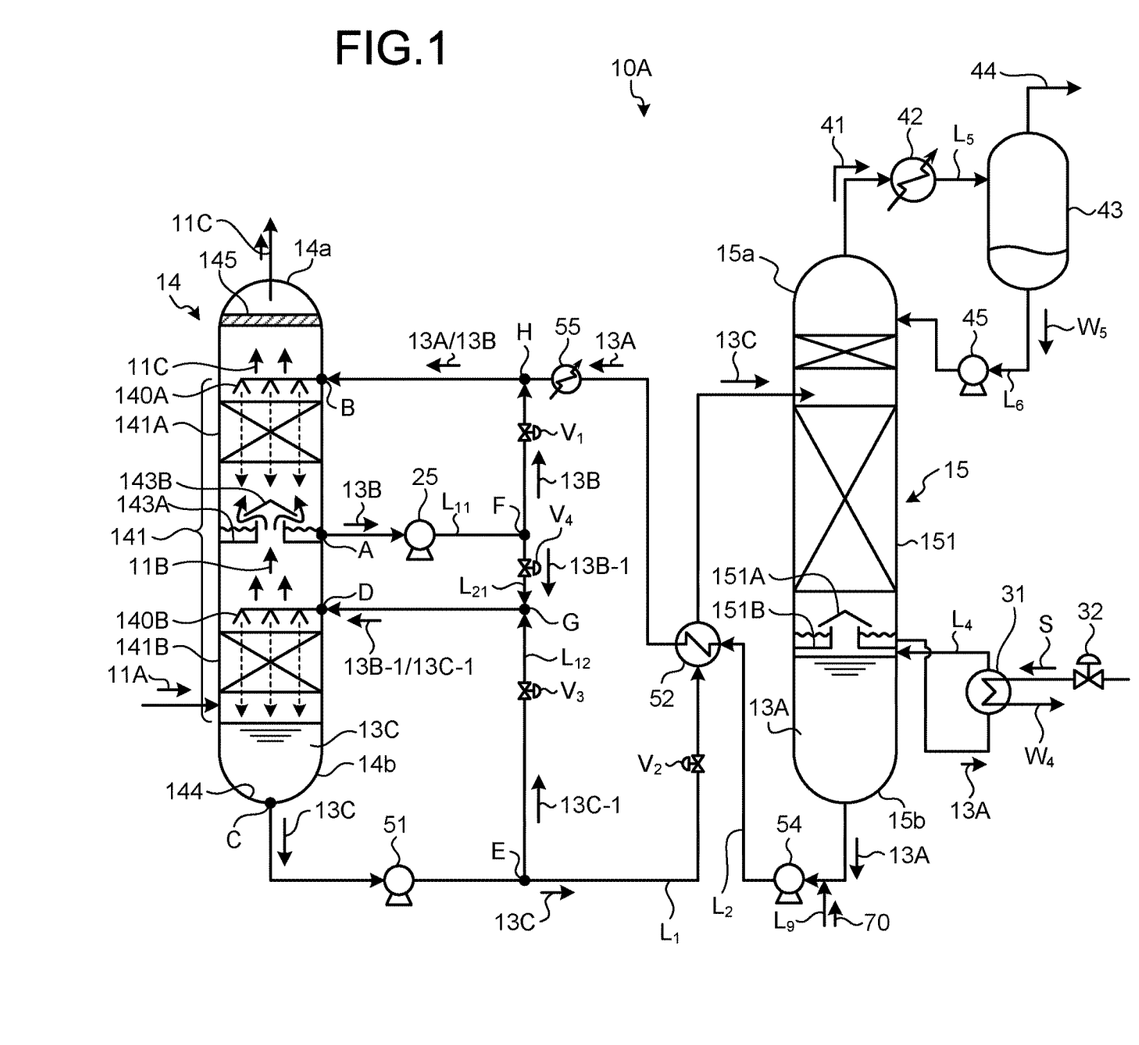
FIG. 1 is a schematic view representing a configuration of a $CO_2$ recovery unit according to a first embodiment.

FIG. 1 is a schematic view representing a configuration of a $CO_2$ recovery unit according to a first embodiment. As illustrated in FIG. 1, a $CO_2$ recovery unit 10A is a unit for recovering $CO_2$ in an introduced gas (e.g., air) 11A under nearly atmospheric pressure with a low concentration of $CO_2$, for example. The $CO_2$ recovery unit 10A is provided with: a $CO_2$ absorber 14 configured to bring the introduced gas 11A into countercurrent contact with a lean solution 13A of a $CO_2$ absorbent for allowing $CO_2$ contained in the introduced gas 11A to be absorbed in the $CO_2$ absorbent and then removed; and an absorbent regenerator 15 that is formed at a subsequent stage of the $CO_2$ absorber 14 to release $CO_2$ from a rich solution 13C of $CO_2$ absorbent containing absorbed $CO_2$ and then regenerate the lean solution 13A.

In this $CO_2$ recovery unit 10A, the $CO_2$ absorbent is circulated between the $CO_2$ absorber 14 and the absorbent regenerator 15. The lean solution 13A of the $CO_2$ absorbent obtained as a result of releasing $CO_2$ absorbs $CO_2$ from the gas in the $CO_2$ absorber 14 to become the rich solution 13C. This rich solution 13C is supplied to the absorbent regenerator 15. The supplied rich solution 13C release $CO_2$ in the absorbent regenerator 15, and is regenerated as the lean solution 13A to be subsequently supplied to the $CO_2$ absorber 14. Here, the $CO_2$ absorbent is a generic term referring to: the lean solution 13A obtained by releasing $CO_2$; a semi-rich solution 13B that absorbs a part of $CO_2$ in the gas; and the rich solution 13C that contains $CO_2$ absorbed from the gas and is discharged from the $CO_2$ absorber 14. Each of the names is selected depending on circulating positions in the $CO_2$ recovery unit 10A and the $CO_2$ content ratio.

The $CO_2$ absorbent usable in the present invention is not particularly limited. Examples of the $CO_2$ absorbent include amine compounds such as alkanolamines and hindered amines with alcoholic hydroxyl groups. Examples of such alkanolamines include monoethanolamine, diethanolamine, triethanolamine, methyl diethanolamine, diisopropanolamine, and diglycolamine. Among them, monoethanolamine (MEA) is generally preferred. Examples of such hindered amines with alcoholic hydroxyl groups include 2-amino-2-methyl-1-propanol (AMP), 2-(ethylamino)-ethanol (EAE), 2-(methylamino)-ethanol (MAE), and 2-(diethylamino)-ethanol (DEAE).

A rich solution supply line $L_1$ is provided to supply the rich solution 13C containing $CO_2$ absorbed in the $CO_2$ absorber 14 to an upper side of the absorbent regenerator 15 between a bottom 14b of the $CO_2$ absorber 14 and a top 15a of the absorbent regenerator 15. The rich solution supply line $L_1$ is provided with: a rich solution pump 51 configured to supply the rich solution 13C containing $CO_2$ absorbed in the $CO_2$ absorber 14 to the absorbent regenerator 15; and a rich/lean solution heat exchanger 52 configured to heat the rich solution 13C using the lean solution 13A that is obtained as a result of releasing $CO_2$ by heating in the absorbent regenerator 15.

A $CO_2$ absorption section 141 includes: a first $CO_2$ absorption stage 141A (referred to as "first absorption stage", hereinafter) arranged to absorb $CO_2$ from the introduced gas 11A; and a second $CO_2$ absorption stage 141B (referred to as "second absorption stage", hereinafter) located below the first absorption stage 141A that are disposed inside the $CO_2$ absorber 14 in its height direction.

A solution reservoir 143A and a chimney tray 143B are provided between the first absorption stage 141A and the second absorption stage 141B. The solution reservoir 143A is arranged to store the semi-rich solution 13B that is flowed down from upper portions of the first absorption stage 141A to reach lower portions of the first absorption stage 141A.

The solution reservoir 143A is provided with a first absorbent circulation line $L_{11}$ that is arranged to discharge a whole amount of the semi-rich solution 13B stored in the solution reservoir 143A through a discharge position A of the $CO_2$ absorber 14 and introduce the discharged solution into an introduction position B located at the upper portion of the first absorption stage 141A that is the same stage as that for the discharge.

The first absorbent circulation line $L_{11}$ is provided with a semi-rich solution pump 25 to circulate the semi-rich solution 13B into the upper portion of the first absorption stage 141A. The first absorbent circulation line $L_{11}$ is provided with a circulation flow control valve $V_1$ that controls a circulation flow rate of the circulated semi-rich solution 13B.

A front end of a lean solution supply line $L_2$ is connected to the first absorbent circulation line $L_{11}$ at a connection position H, such that the lean solution 13A regenerated in the absorbent regenerator 15 is mixed with the circulated semi-rich solution 13B (circulation solution 13B) to form a mixture (13A/13B). The mixture is introduced into an upper stage liquid distributor 140A. The front end of the lean solution supply line $L_2$ may be connected directly to the upper stage liquid distributor 140A at the upper portion of the first absorption stage 141A without connected to the first absorbent circulation line $L_{11}$ such that the lean solution 13A and the circulated semi-rich solution 13B (circulation solution 13B) are individually introduced into the upper stage liquid distributor 140A.

A second absorbent circulation line $L_{12}$ is provided to be connected at a liquid reservoir 144 located at a bottom of the $CO_2$ absorber to discharge a whole amount of the rich solution 13C stored in the liquid reservoir 144 through a discharge position C of the $CO_2$ absorber 14 and introduce the discharged solution into an introduction position D positioned at an upper part of the second absorption stage 141B that is the same stage as the stage for the discharge.

A part of the rich solution 13C is separated as a circulation solution 13C-1 at a discharge position E by the second absorbent circulation line $L_{12}$. The second absorbent circulation line $L_{12}$ is connected at the discharge position E to a base end of the rich solution supply line $L_1$. The rich solution 13C discharged is supplied through the rich solution supply line $L_1$ to the absorbent regenerator 15. The rich solution supply line $L_1$ is provided with a rich solution flow control valve $V_2$ to control the amount of the rich solution 13C supplied to the absorbent regenerator 15. The second absorbent circulation line $L_{12}$ is provided with a circulation flow control valve $V_3$ to control the circulation flow rate of the circulated circulation solution 13C-1.

An absorbent discharge line $L_{21}$ is provided to discharge a part of the semi-rich solution 13B (circulation solution 13B) circulated from the first absorbent circulation line $L_{11}$ as a discharged solution 13B-1 at a discharge position F and supply the discharged solution 13B-1 to the second absorption stage 141B that is the adjacent stage immediately below the stage for the discharge.

In the present embodiment, the front end of the absorbent discharge line $L_{21}$ is connected at a connection position G to the second absorbent circulation line $L_{12}$, such that the discharged solution 13B-1 is mixed with the circulation solution 13C-1 to form the mixture (13B-1/13C-1). The mixture is supplied through a single line to the introduction position D located at the upper portion of the second absorption stage 141B. The front end of the absorbent discharge line $L_{21}$ may be connected directly to the lower stage liquid distributor 140B at the upper portion of the second absorption stage 141B without connected to the second absorbent circulation line $L_{12}$ such that the discharged solution 13B-1 and the circulation solution 13C-1 are individually introduced into the lower stage liquid distributor 140B.

In addition, a discharge flow control valve $V_4$ is provided in the absorbent discharge line $L_{21}$ to control the discharge flow rate of the discharged solution 13B-1.

In the first absorption stage 141A, the lean solution 13A regenerated in the absorbent regenerator 15 and the circulated semi-rich solution 13B (circulation liquid 13B) are supplied as the $CO_2$ absorbents. The supplied lean solution 13A and the circulated semi-rich solution 13B (circulation liquid 13B) are distributed from the upper stage liquid distributor 140A that is located at the upper portion of the first absorption stage 141A, and then flowed down within a packed bed. Here, the semi-rich solution 13B as the circulation solution has a higher $CO_2$ concentration than the lean solution 13A, but is still capable of absorbing $CO_2$. Thus, the semi-rich solution 13B can be reused in the first absorption stage 141A to absorb $CO_2$ from the introduced gas 11B.

To the second absorption stage 141B, the circulation solution 13C-1 is supplied together with the discharged solution 13B-1 of the semi-rich solution 13B containing $CO_2$ absorbed partially from the introduced gas 11B in the first absorption stage 141A. The supplied discharged solution 13B-1 and the circulation solution 13C-1 are distributed from the lower stage liquid distributor 140B at the upper portions of the second absorption stage 141B and flowed down within the packed bed. Here, the rich solution 13C as the circulation solution has a higher $CO_2$ concentration than the semi-rich solution 13B, but is still capable of absorbing $CO_2$. Thus, the rich solution 13C can be reused in the second absorption stage 141B to absorb $CO_2$ from the introduced gas 11A.

In the first absorption stage 141A of the $CO_2$ absorber 14, the introduced gas 11B containing $CO_2$ is brought into countercurrent contact with the mixture of the lean solution 13A made of the amine compound-based $CO_2$ absorbent and the circulated semi-rich solution 13B (circulation solution 13B) that are introduced into the tower. As a result, the gas introduced into the tower becomes an outlet gas 11C by removing $CO_2$ in the gas while the lean solution 13A becomes the semi-rich solution 13B.

In the second absorption stage 141B, the semi-rich solution 13B (discharged solution 13B-1 and the circulation solution 13C-1) partially absorbing $CO_2$ is brought into countercurrent contact with the introduced gas 11A that contains $CO_2$ and is introduced from a bottom side of the tower, allowing $CO_2$ to be absorbed into the semi-rich solution 13B from the introduced gas 11A by a chemical reaction. As a result, the introduced gas 11A becomes the introduced gas 11B with a reduced $CO_2$ concentration by removing $CO_2$ in the gas while the semi-rich solution 13B becomes the rich solution 13C with higher amount of absorbed $CO_2$. This arrangement allows the introduced gases 11A and 11B containing $CO_2$ to be flowed through the first absorption stage 141A and the second absorption stage 141B, removing $CO_2$ to provide a decarbonated outlet gas 11C.

A mist eliminator 145 is installed inside a tower top 14a to capture mist contained in the decarbonated outlet gas 11C and then discharge the gas outwardly from the tower top 14a of the $CO_2$ absorber 14.

The absorbent regenerator 15 is provided at its interior with a packed bed 151 to release $CO_2$ with aid of water vapor from the rich solution 13C containing absorbed $CO_2$. The absorbent regenerator 15 is provided at the vicinity of a tower bottom 15b with a circulation line $L_4$ that circulates therethrough a part of the lean solution 13A flowed down to the tower bottom 15b. The circulation line $L_4$ is provided with a reboiler 31 that generates water vapor by indirect heating of the lean solution 13A with use of saturated steam S, and a control valve 32 that controls the amount of saturated steam S supplied to the reboiler 31. The saturated steam S becomes steam condensate $W_4$ after the heating.

The absorbent regenerator 15 is provided at its top 15a with a gas discharge line $L_5$ to discharge $CO_2$ gas 41 together with water vapor. The gas discharge line $L_5$ is provided with a condenser 42 that condenses the water vapor discharged together with the $CO_2$ gas 41 into water, and a separation drum 43 to separate a $CO_2$ gas 44 from condensed water $W_5$. The $CO_2$ gas 44 separated from the condensed water $W_5$ is discharged outwardly from an upper portion of the separation drum 43. A condensed water line $L_6$ is provided between the bottom part of the separation drum 43 and the top 15a of the absorbent regenerator 15 to supply the condensed water $W_5$ separated in the separation drum 43 to the top 15a of the absorbent regenerator 15. The condensed water line $L_6$ is provided with a condensed water circulation pump 45 to supply the condensed water $W_5$ separated in the separation drum 43 to the top 15a of the absorbent regenerator 15.

The lean solution supply line $L_2$ is provided between the bottom 15b of the absorbent regenerator 15 and the top 14a of the $CO_2$ absorber 14 to supply the lean solution 13A of the $CO_2$ absorbent from the bottom 15b of the absorbent regenerator 15 to the upper side of the $CO_2$ absorption section 141. The lean solution supply line $L_2$ is provided with: a rich/lean solution heat exchanger 52 that heats the rich solution 13C containing the absorbed $CO_2$ with use of the lean solution 13A that is obtained by heating with water vapor in the absorbent regenerator 15 for the removal of $CO_2$; a lean solution pump 54 that supplies the lean solution 13A from the bottom 15b of the absorbent regenerator 15 to the upper portion of the $CO_2$ absorption section 141; and a cooling part 55 that cools the lean solution 13A of the $CO_2$ absorbent down to a predetermined temperature.

In the present embodiment, this cooling part 55 is configured to cool the lean solution 13A down to the same temperature as or a temperature close to a gas temperature (room temperature: e.g., 25° C.) of the introduced gas 11A introduced into the $CO_2$ absorber 14.

Next, the overall operation of the $CO_2$ recovery unit 10A according to the present embodiment is described. For example, the introduced gas (atmospheric gas) 11A containing a subtle amount of $CO_2$ is introduced into the interior of the $CO_2$ absorber 14 through the bottom 14b of the $CO_2$ absorber 14 and flows upward inside the tower. The gas introduced into the $CO_2$ absorber 14 is brought into countercurrent contact with the $CO_2$ absorbent containing the amine compound such as alkanolamine in the first absorption stage 141A and second absorption stage 141B of the $CO_2$ absorption section 141, such that $CO_2$ is absorbed from the gas into the $CO_2$ absorbent and then removed for the purpose of providing the decarbonated outlet gas 11C.

The decarbonated outlet gas 11C is discharged outwardly from the top 14a of the $CO_2$ absorber 14.

After the absorption of $CO_2$ in the $CO_2$ absorber 14, the rich solution 13C of the $CO_2$ absorbent is flowed in the rich solution supply line $L_1$ to pass through the rich/lean solution heat exchanger 52 for heat exchange with the lean solution 13A and then supplied to the top side of the absorbent regenerator 15 with the aid of the rich solution pump 51.

The rich solution 13C of the $CO_2$ absorbent supplied to the absorbent regenerator 15 is allowed to release $CO_2$ by the heat of the water vapor supplied from the reboiler 31 while flowing downward inside the packed bed 151 of the absorbent regenerator 15, so as to become the lean solution 13A. In the absorbent regenerator 15, the solution is circulated from the liquid reservoirs 151B of the chimney tray 151A into the circulation line $L_4$ while heated by saturated steam S in the reboiler 31 to generate water vapor inside the absorbent regenerator 15. The lean solution 13A is obtained as a result of releasing $CO_2$ from the rich solution 13C with the aid of the heat of this generated water vapor. After the heating, the saturated steam S becomes steam condensate $W_4$. The $CO_2$ gas 41 released together with the water vapor from the $CO_2$ absorbent is cooled down for the condensation into water with use of the condenser 42, separated from the condensed water $W_5$, and then discharged as the $CO_2$ gas 44 outwardly through the upper portion of the separation drum 43. The condensed water $W_5$ separated is supplied to the absorbent regenerator 15.

After discharged from the bottom 15b of the absorbent regenerator 15, the lean solution 13A is flowed in the lean solution supply line $L_2$ to pass through the rich/lean solution heat exchanger 52 for heat exchange with the rich solution 13C and then supplied to the upper side of the $CO_2$ absorption section 141 of the $CO_2$ absorber 14 with the aid of the lean solution pump 54.

After supplied to the upper side of the $CO_2$ absorption section 141, the lean solution 13A absorbs $CO_2$ from the introduced gas 11B in the first absorption stage 141A to become the semi-rich solution 13B, which is discharged at the discharge position A at the lower portion of the first absorption stage 141A and flowed into the first absorbent circulation line $L_{11}$. The discharged semi-rich solution 13B is supplied with the aid of the semi-rich solution pump 25 together with the lean solution 13A to the introduction position B positioned at the upper side of the first absorption stage 141A.

In the second absorption stage 141B, $CO_2$ is absorbed from the introduced gas 11B to form the rich solution 13C. The rich solution 13C is discharged at the discharge position C at the lower part of the second absorption stage 141B and flowed into the second absorbent circulation line $L_{12}$. The discharged rich solution 13C is separated at the discharge position E, as the circulation solution 13C-1. Then, the circulation solution 13C-1 is supplied with the aid of the rich solution pump 51 to the introduction position D at the upper portion of the second absorption stage 141B.

A part of the semi-rich solution 13B is separated at the discharge position F of the first absorbent circulation line $L_{11}$ by the absorbent discharge line $L_{21}$. The discharged solution 13B-1 is mixed with the circulation solution 13C-1 at the connection position G of the second absorbent circulation line $L_{12}$. This discharged solution 13B-1 and the circulation solution 13C-1 are mixed with each other (13B-1/13C-1) and then supplied through a single line to the introduction position D at the upper portion of the second absorption stage 141B.

After separated from the circulation solution 13C-1 at the discharge position E, the rich solution 13C is supplied to the absorbent regenerator 15 through the rich solution supply line $L_1$.

Therefore, the configuration according to the present embodiment includes: the first absorbent circulation line $L_{11}$ for supplying the semi-rich solution 13B discharged at the lower side of the first absorption stage 141A in the $CO_2$ absorber 14 to the upper side of the same stage 141A as the stage for the discharge; the second absorbent circulation line $L_{12}$ for supplying the rich solution 13C discharged at the lower side of the second absorption stage 141B of the $CO_2$ absorber 14 to the upper side of the second absorption stage 141B that is the same stage as the stage for the discharge; the absorbent discharge line $L_{21}$ for separating the circulated semi-rich solution 13B (circulation solution 13B) discharged at the lower side of the first absorption stage 141A and then mixing the separated solution with the lean solution 13C-1 that is discharged at the lower side of the second absorption stage 141B that is the adjacent stage immediately below the stage for the discharge; the lean solution supply line $L_2$ for supplying the lean solution from the absorbent regenerator 15 to the upper portion of the first absorption stage 141A that is the highest stage of the $CO_2$ absorber 14 and then mixing the supplied solution with the semi-rich solution 13B discharged at the lower side of the first absorption stage 141A; and the rich solution supply line $L_1$ for flowing the rich solution 13C from the bottom part of the $CO_2$ absorber 14 to the absorbent regenerator 15.

Thus, according to the first embodiment, after absorbing $CO_2$, the semi-rich solution 13B and the rich solution 13C that contain absorbed $CO_2$ can be discharged and flowed outwardly through the lower sides of the first absorption stage 141A and the second absorption stage 14B, respectively, and supplied as the circulation solutions to the upper portions at the corresponding stages above the absorbent-discharged portions. This allows the circulated circulation solutions to be reused as the absorbents in the first absorption stage 141A and the second absorption stage 14B to recover $CO_2$ in the gas. As a result, with increase of the $CO_2$ concentration in the $CO_2$ absorbent, it is possible to improve the $CO_2$ recovery efficiency in the $CO_2$ absorber 14 and thereby increase the $CO_2$ recovery amount per unit volume of the $CO_2$ absorbent. Furthermore, the $CO_2$ concentration in the rich solution 13C can be increased at the bottom 14b of the $CO_2$ absorber 14, thereby allowing the rich solution 13C having an increased $CO_2$ concentration to be supplied to the absorbent regenerator 15.

Here, when the two-stage configuration for the absorption section, the first absorption stage 141A and the second absorption stage 141B, as in the present embodiment, the solution discharged from the circulation solution 13C-1 is the rich solution 13C, while the rich solution supply line $L_1$ functions as an absorbent discharge line to supply the discharged rich solution 13C to the absorbent regenerator 15. In the case of three-stage configuration for the absorption section, the first absorption stage 141A, the second absorption stage 141B, and a third absorption stage, a solution discharged from the circulation solution 13C-1, which is supplied from the second absorption stage 141B, is supplied as the discharged solution to the third absorption stage immediately below the discharged stage of the second absorption stage.

As a result, the semi-rich solution 13B and the rich solution 13C are reused twice in the $CO_2$ absorber 14, enabling it to reduce the flow rate of the circulated $CO_2$ absorbent in the system circulating between the $CO_2$ absorber 14 and the absorbent regenerator 15. This can reduce the flow rate of the rich solution 13C supplied to the absorbent regenerator 15, reducing the steam supply amount of the reboiler 31 used in the absorbent regenerator 15 for the regeneration of the $CO_2$ absorbent, and thereby reducing heat energy consumption to improve energy efficiency.

In the present embodiment, even in the case of recovering $CO_2$ from a gas containing a very subtle amount of $CO_2$ (e.g., air), the $CO_2$ concentration can be increased in the rich solution 13C supplied to the absorbent regenerator 15 so as to reduce the steam amount required in the absorbent regenerator 15, thereby reducing the thermal energy as well as achieving further energy saving in the process of regenerating the $CO_2$ absorbent.

Next, the separation ratios of the circulation solution to the discharged solution in the $CO_2$ recovery unit 10A according to the present embodiment, is described.

In the present embodiment, regarding the flow rate (f1) of the semi-rich solution 13B (circulation solution 13B) circulated through the first absorbent circulation line $L_{11}$ from the lower portion of the first absorption stage 141A and the flow rate (f2) of the discharged solution 13B-1 discharged via the absorbent discharge line $L_{21}$, the separation ratio of the flow rates (referred to as "separation flow ratio", hereinafter) is preferably 1:1 to 60:1, preferably 10:1 to 60:1, more preferably 30:1 to 60:1.

Regarding the flow rate (f3) of the circulation solution 13C-1 flowed into the second absorbent circulation line $L_{12}$ and the flow rate (f4) of the rich solution 13C flowed into the rich solution supply line $L_1$ from the bottom of the $CO_2$ absorber 14, the flow separation ratio of the flow rates is preferably 1:1 to 60:1, preferably 10:1 to 60:1, more preferably 30:1 to 60:1.

Hereinafter, preferred test examples exhibiting effects of the separation flow ratio according to the present embodiment are described. The present invention is not limited to these examples. FIGS. 4 to 9 in these test examples illustrate examples for gas having a $CO_2$ concentration of 1% or less.

Figure 4:
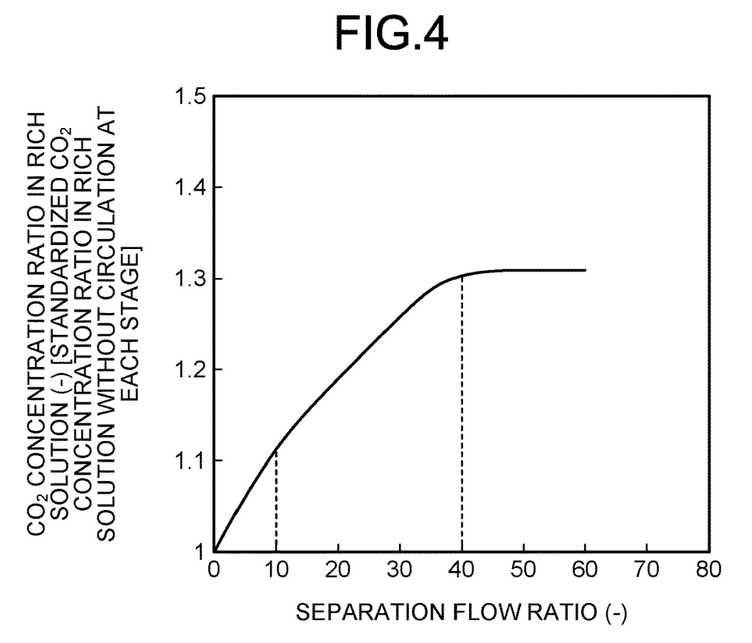
FIG. 4 is a graph representing $CO_2$ concentration ratios in a rich solution in test example 1.

FIG. 4 a graph representing $CO_2$ concentration ratios in the rich solution in test example 1. Herein, FIG. 4 represents a performance improvement ratio calculated based on standardized $CO_2$ concentration (1) without the discharge at each stage. In FIG. 4, the horizontal axis represents the separation flow ratio of the flow rate (f1) of the semi-rich solution 13B (circulation solution 13B) circulated through the first absorbent circulation line $L_{11}$ to the flow rate (f2) of the discharged solution 13B-1 supplied to the absorbent discharge line $L_{21}$, in the range of 1:1 to 60:1 (the same applies to FIGS. 5 and 6). The same applies to the separation flow ratio of the flow rate (f1) of the circulation solution 13C-1 circulated through the second absorbent circulation line $L_{12}$ to the flow rate (f2) of the rich solution 13C supplied to the rich solution supply line $L_1$, in the range of 1:1 to 60:1.

Figure 5:
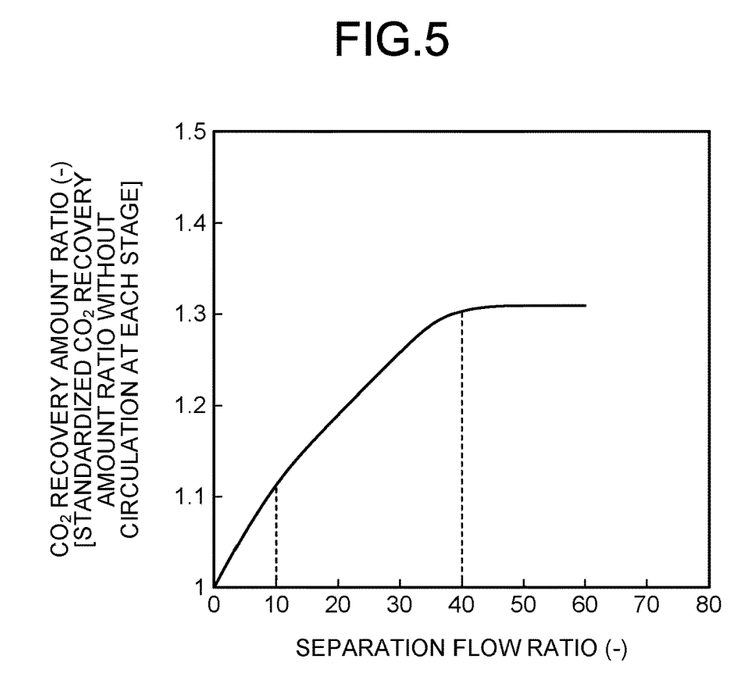
FIG. 5 is a graph representing $CO_2$ recovery amount ratios in test example 1.
Figure 6:
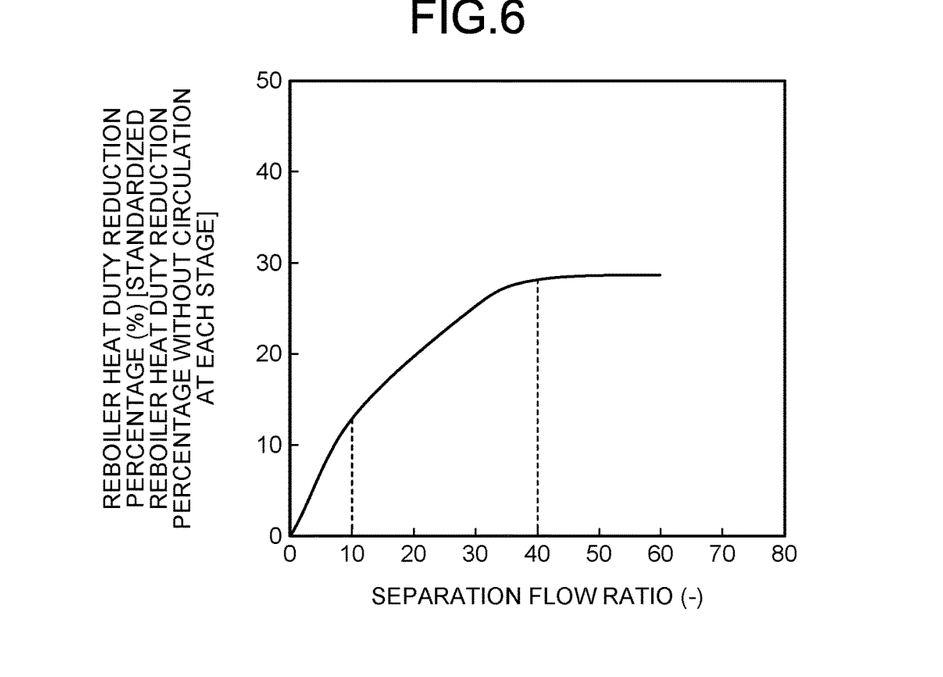
FIG. 6 is a graph representing reduction percentages (%) of reboiler heat duty in an absorbent regenerator in test example 1.

FIG. 5 is a graph representing $CO_2$ recovery amount ratios in test example 1. Herein, FIG. 5 represents a performance improvement ratio calculated based on standardized $CO_2$ recovery amount (1) without the discharge at each stage. FIG. 6 is a graph representing reduction percentages (%) of reboiler heat duty in the absorbent regenerator in test example 1. FIG. 6 represents the reduction percentages (%) calculated based on standardized reboiler heat duty reduction percentages (0) without the discharge.

As illustrated in FIGS. 4 to 6, in test example 1, the separation flow ratio in the range of 1:1 to 60:1 allows for improvement in the separation effects on the $CO_2$ concentration ratio in the rich solution, the $CO_2$ recovery amount ratio, and the reboiler heat duty reduction percentage (%). In particular, the separation flow ratio in the range of 1:1 to 40:1 allows for improvement in the increase ratio of the separation effects on the $CO_2$ concentration ratio in the rich solution, the $CO_2$ recovery amount ratio, and the reboiler heat duty reduction percentage (%).

Here, the $CO_2$ absorption rate of the absorbent is represented as the product of the volumetric mass transfer coefficient (the product of the mass transfer coefficient and the gas-liquid contact area) and the driving force (the difference between the $CO_2$ partial pressure and the $CO_2$ equilibrium pressure). In the case of returning the absorbent of the semi-rich solution 13B (circulation solution 13B) circulating from the rich solution side at the bottom side of the $CO_2$ absorber 14 to the top of the $CO_2$ absorber 14, as disclosed in the prior art (Patent Literature 1), the concentration of acid gas ($CO_2$) may be increased at the outlet side due to decrease in the driving force when the $CO_2$ content is high in the gas (such as boiler flue gas with a $CO_2$ concentration of more than 10% and 15% or less).

In contrast, when $CO_2$ is removed from the gas with a low $CO_2$ concentration of 1% such as atmospheric air as in this test example, even if the absorbent is circulated from the rich solution side on the bottom side of the $CO_2$ absorber to the lean solution side on the upper side of the $CO_2$ absorber including the top thereof, it is possible to improve the volumetric mass transfer coefficient to such a great extent as to outweigh the decrease of the driving force, and thereby improve the $CO_2$ absorption rate. Thus, the improvement in $CO_2$ absorption rate in the present invention is particularly noticeable under conditions with the relatively low $CO_2$ concentration in the target gas.

Therefore, examples of the gas with low $CO_2$ concentration applicable to the present invention include a gas at nearly atmospheric pressure containing a subtle amount (with a $CO_2$ concentration of 1% or less), preferably a gas at nearly atmospheric pressure with a $CO_2$ concentration of 10% or less, more preferably a gas at nearly atmospheric pressure with a $CO_2$ concentration of 5% or less. Examples of the gas with a $CO_2$ concentration of 10% or less include flue gases from boilers, gas turbines, combustion furnaces, heating furnaces, incinerators, internal combustion engines, and the like, for example, as well as atmospheric air and air in closed and substantially closed spaces.

In the present invention, in the case of targeting air, or air in the closed or substantially closed space, the lean absorbent temperature is desired to be same as or as close as possible to the target gas temperature.

When the introduced gas 11 in the $CO_2$ absorber 14 is atmospheric gas or air with unsaturated water vapor, the water content of the absorbent is evaporated and then exhausted as moisture saturated gas, thereby requiring water to be supplied to the absorbent. The higher the lean solution temperature, the higher amount of water supplied to the absorbent, due to increase in the temperature of the outlet gas 11C of the $CO_2$ absorber 14 and increased amount of exhausted water content resulting from increase of saturated water content. For this reason, as illustrated in FIG. 1, the lean solution supply line $L_2$ is provided with a supply water introduction line $L_9$ to introduce supplied water 70 to dilute the absorbent in the present embodiment, preventing the amine concentration from increased in the absorbent.

The amount of absorbed $CO_2$ is small when the introduced gas 11A in the $CO_2$ absorber 14 is atmospheric gas or air with unsaturated water vapor. Thus, the amount of heat absorption resulting from the evaporative latent heat of water content is greater than the amount of heat generated by the reaction when $CO_2$ is absorbed from the flue gas exhausted from the boiler as in the conventional system. Therefore, even when the lean solution 13A with the same temperature as the introduced gas 11A is used, for example, the outlet gas temperature ($T_2$) of the outlet gas 11C is lower by approximately 3° C. than that ($T_1$) of the introduced gas 11A under the condition that the gas temperature ($T_1$) of the introduced gas 11A in test example 1 according to first embodiment is 25° C.

Thus, under the condition that $CO_2$ is removed from a gas containing a subtle amount of $CO_2$ (a $CO_2$ concentration of 1% or less), the temperature of the circulation solution in the absorption section is lower than that of the lean solution 13A introduced into the $CO_2$ absorber 14, without a cooler installed in the first absorbent circulation line $L_{11}$ and the second absorbent circulation line $L_{12}$. As a result, the reaction heat of the amine solution is not generated when $CO_2$ is absorbed inside the absorber as in the prior arts, thereby not requiring the cooler in the first absorbent circulation line $L_{11}$ and the second absorbent circulation line $L_{12}$ in which the semi-rich solution 13B and the rich solution 13C are circulated.

Figure 7:
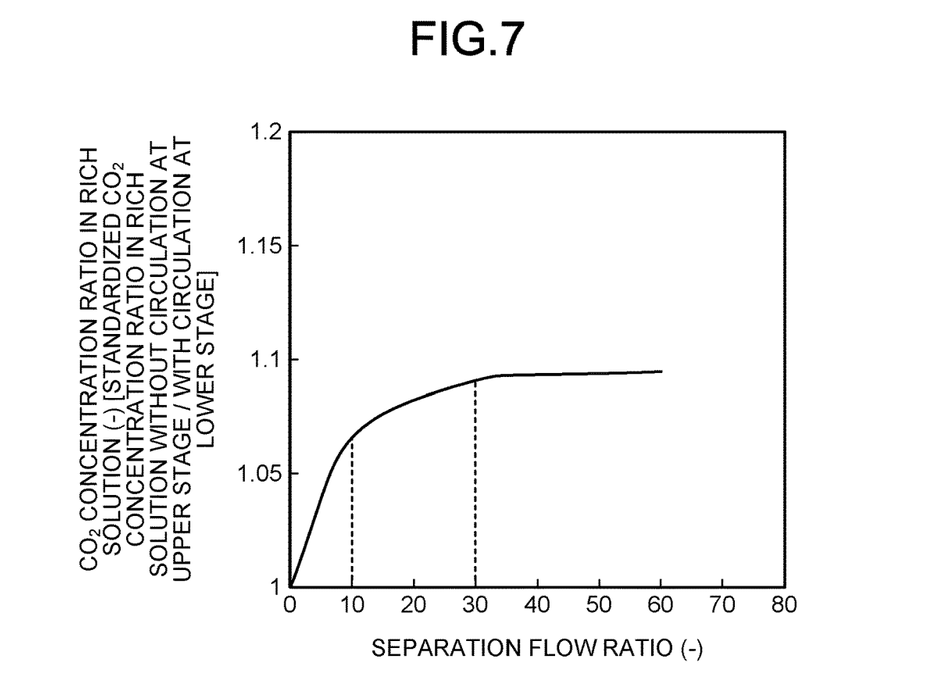
FIG. 7 is a graph representing $CO_2$ concentration ratios in a rich solution in test example 2.
Figure 8:
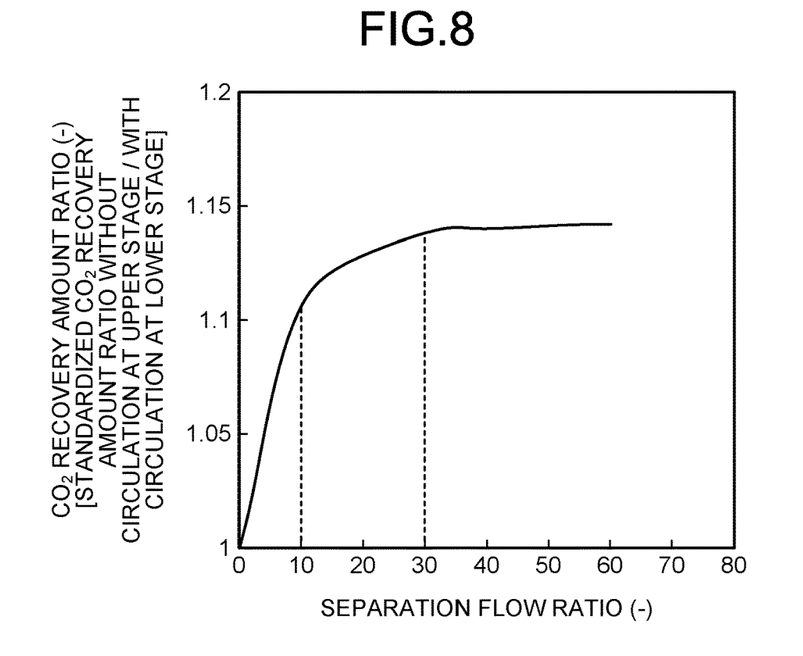
FIG. 8 is a graph representing $CO_2$ recovery amount ratios in test example 2.
Figure 9:
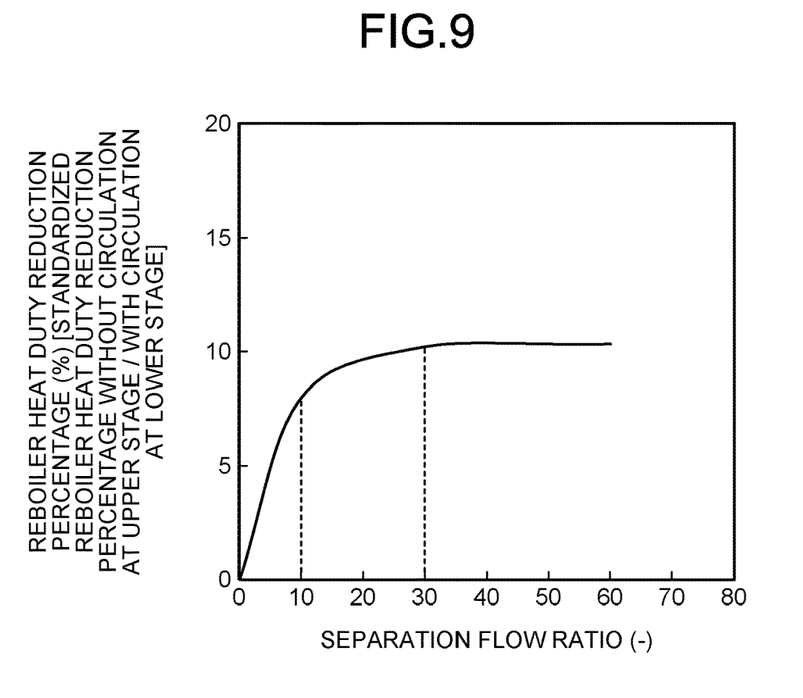
FIG. 9 is a graph representing reduction percentages (%) of reboiler heat duty in an absorbent regenerator in test example 2.

FIGS. 7 to 9 illustrate performances with comparison to the prior art (Patent Literature 2: International Publication No. 09/104744) in which only the second absorbent circulation line $L_{12}$ is used to circulate the absorbent, without the first absorbent circulation line $L_{11}$ installed as in the present invention, (with circulation at the lower stage without circulation at the upper stage) (Comparative Example 2).

FIG. 7 is a graph representing $CO_2$ concentration ratios in the rich solution in test example 2. Herein, FIG. 7 represents a performance improvement ratio calculated based on standardized $CO_2$ concentration (1) with circulation at the lower stage without circulation at the upper stage. In FIG. 7, the horizontal axis represents the separation flow ratio of the flow rate (f1) of the semi-rich solution 13B (circulation solution 13B) circulated through the first absorbent circulation line $L_{11}$ to the flow rate (f2) of the discharged solution 13B-1 supplied to the absorbent discharge line $L_{21}$, in the range of 1:1 to 60:1 (the same applies to FIGS. 9 and 10). The same applies to the separation flow ratio of the flow rate (f1) of the circulation solution 13C-1 circulated through the second absorbent circulation line $L_{12}$ to the flow rate (f2) of the rich solution 13C supplied to the rich solution supply line $L_1$, in the range of 1:1 to 60:1.

FIG. 8 is a graph representing $CO_2$ recovery amount ratios in test example 2. Herein, FIG. 8 represents the performance improvement ratio calculated based on standardized $CO_2$ recovery amount (1) with circulation at the lower stage without circulation at the upper stage.

FIG. 9 is a graph representing reduction percentages (%) of reboiler heat duty in the absorbent regenerator in test example 2. FIG. 9 represents the reduction percentages (%) calculated based on standardized reboiler heat duty reduction percentages (0) with circulation at the lower stage without circulation at the upper stage.

As illustrated in FIGS. 7 to 9, in test example 2, the separation ratio of the flow rates in the range of 1:1 to 60:1 allows for improvement in the separation effects on the $CO_2$ concentration ratio in the rich solution, the $CO_2$ recovery amount ratio, and the reboiler heat duty reduction percentage (%). In particular, the separation ratio of the flow rates in the range of 1:1 to 30:1 allows for improvement in the increase ratio of the separation effects on the $CO_2$ concentration ratio in the rich solution, the $CO_2$ recovery amount ratio, and the reboiler heat duty reduction percentage (%).

Although explanations are given for the $CO_2$ recovery unit 10A according to the present embodiment in which two absorption stages (the first absorption stage 141A and the second absorption stage 141B) are provided in the $CO_2$ absorber 14, the present invention is not limited to this. Two or more absorption stages are provided (another absorption stage is provided between the first absorption stage 141A and the second absorption stage 141B) in the $CO_2$ absorber 14 such that the circulation and discharge are performed at the predetermined separation ratio of the flow rates to circulate the absorbent.

Second Embodiment

Figure 2:
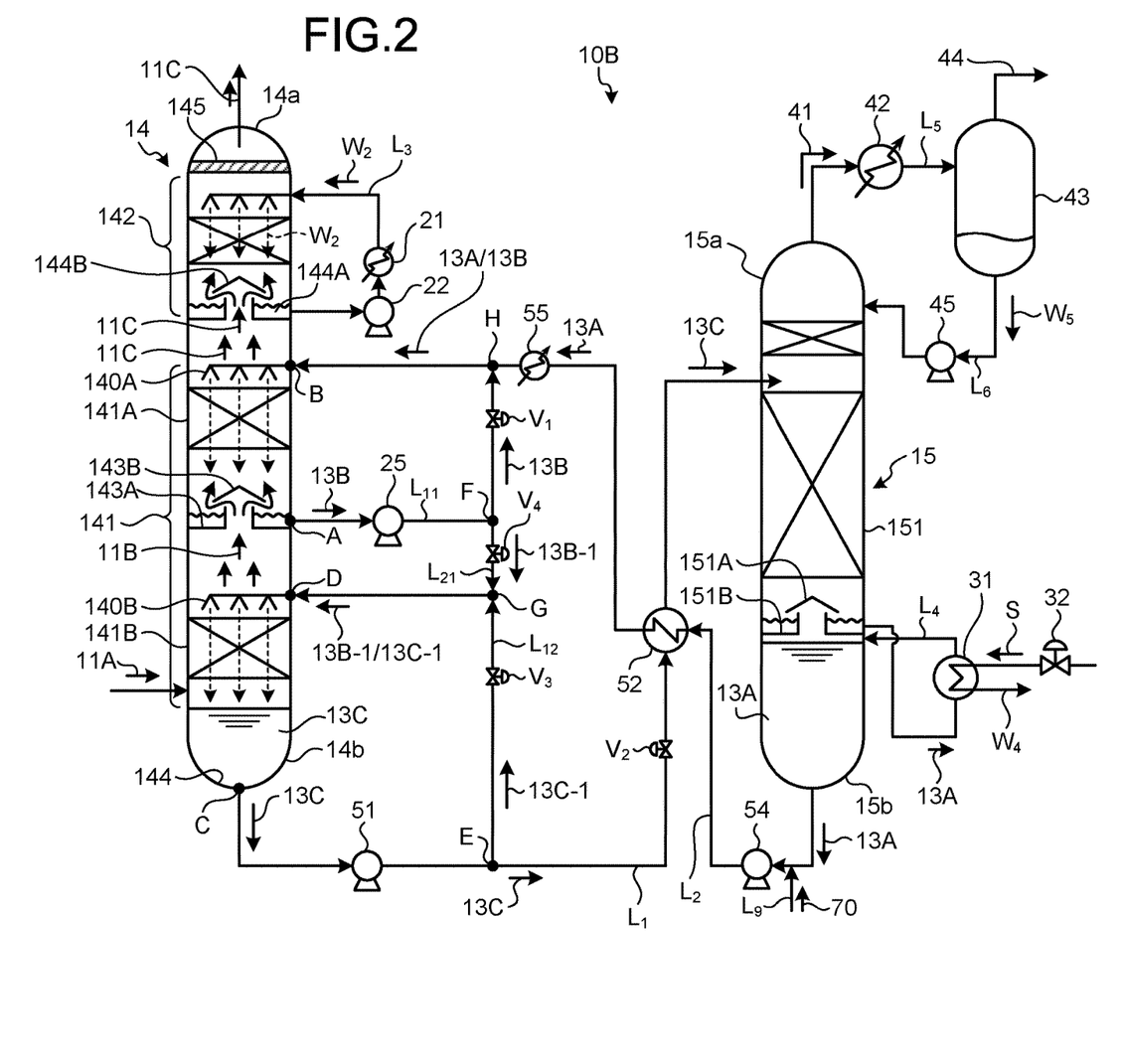
FIG. 2 is a schematic view representing a configuration of a $CO_2$ recovery unit according to a second embodiment.

FIG. 2 is a schematic view representing configuration of a $CO_2$ recovery unit according to a second embodiment. Descriptions are given for new configuration in the second embodiment added to the $CO_2$ recovery unit 10A according to the first embodiment illustrated in FIG. 1. The same components as in the configuration according to the first embodiment are not described.

A $CO_2$ recovery unit 10B according to the second embodiment is provided with a wash section 142 that is added inside the top part 14a of the first absorption stage 141A of the $CO_2$ absorber 14 on a downstream side of the gas flow in the $CO_2$ recovery unit 10A according to the first embodiment.

The wash section 142 is provided at its bottom with a liquid reservoir 144A that stores therein washing water $W_2$ to wash the decarbonated outlet gas 11C. A circulation line $L_3$ is provided between the liquid reservoir 144A and the top of the wash section 142 to supply wash water $W_2$ containing the $CO_2$ absorbent collected in the liquid reservoir 144A for circulation from the top part 14a side of the wash section 142. The circulation line $L_3$ is equipped with a heat exchanger 21 that cools the wash water $W_2$ and a circulation pump 22 that circulates the wash water $W_2$ containing the $CO_2$ absorbent collected in the liquid reservoir 144A through the heat exchanger 21 in the circulation line $L_3$.

In the present embodiment, $CO_2$ is recovered in the gas with low $CO_2$ concentration, thereby the $CO_2$ absorption does not involve the exothermic reaction of the amine-based absorbent, as described above. However, the water wash section 142 illustrated in FIG. 2 is preferably provided to minimize loss of the amine-based absorbent in the outlet gas 11C discharged outwardly, from the perspective of achieving near zero emission.

Third Embodiment

Figure 3:
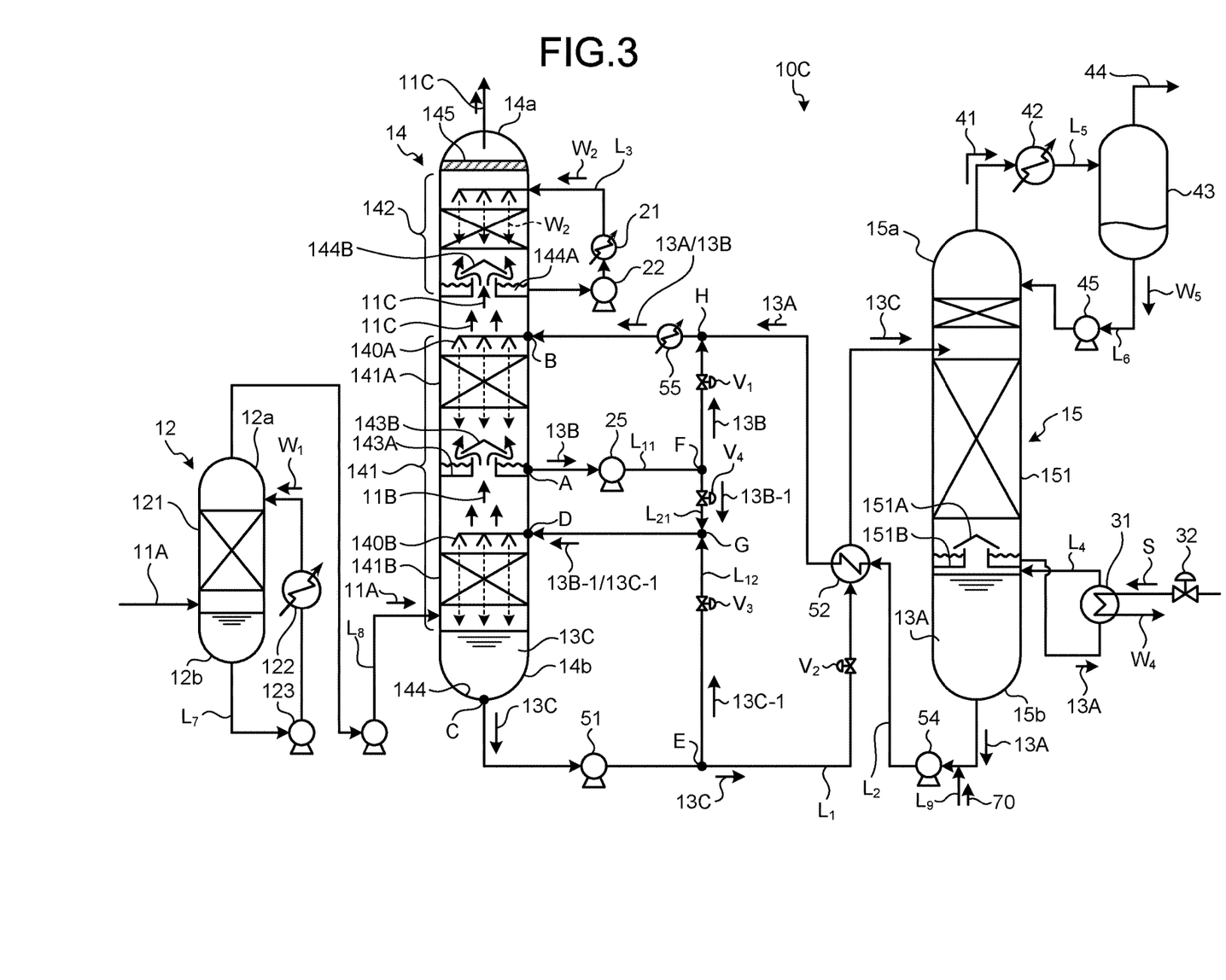
FIG. 3 is a schematic view representing a configuration of a $CO_2$ recovery unit according to a third embodiment.

FIG. 3 is a schematic view representing configuration of a $CO_2$ recovery unit according to a third embodiment. Descriptions are given for new configuration in the third embodiment added to the $CO_2$ recovery unit 10B according to the second embodiment illustrated in FIG. 2. The same components as in the configuration according to the first embodiment are not described.

A $CO_2$ recovery unit 10C according to the third embodiment is provided with a gas quencher 12, which is added on an upstream side of the $CO_2$ absorber 14 in the $CO_2$ recovery unit 10B according to the second embodiment, to cool the introduced gas 11A down to a predetermined temperature. The gas quencher 12 has a quencher section 121 to cool the introduced gas 11A. A water circulation line $L_7$ is provided to circulate the cooling water $W_1$ between the bottom 12b side of the gas quencher 12 and the top 12a side of the quencher section 121. The water circulation line $L_7$ is equipped with a heat exchanger 122 that cools the cooling water $W_1$ and a circulation pump 123 that circulates the cooling water $W_1$ in the water circulation line $L_7$.

In the quencher section 121, the introduced gas 11A is brought into countercurrent contact with the cooling water $W_1$ so as to be cooled down to a predetermined temperature. The heat exchanger 122 cools the cooling water $W_1$ heated by heat exchange with the introduced gas 11A. The circulation pump 123 supplies the cooling water $W_1$ flowing down to the bottom 12b of the gas quencher 12 via the heat exchanger 122 to the top 12a of the quencher section 121. After cooled, the introduced gas 11A is introduced into the $CO_2$ absorber 14 from the vicinity of the bottom of the $CO_2$ absorber 14 via the introduction line $L_8$.

In the third embodiment, the cooling part 55, which is installed in the lean solution supply line $L_2$ in the preceding configuration, is installed in the first absorbent circulation line $L_{11}$. This allows for cooling of the mixed solution (13A/13B) of the semi-rich solution 13B (circulation solution 13B) circulating from the first absorbent circulation line $L_{11}$ and the lean solution 13A flowed from the lean solution supply line $L_2$.

The present embodiment differs from the first embodiment in that it is preferable to aim for gases (e.g., turbine flue gas and various flue gases) containing 3% or more and 10% or less of $CO_2$ as the introduced gas 11A. For the gases containing 3% or more of $CO_2$, the liquid temperature of the lean solution 13A is expected to be a lean absorbent temperature at a temperature level of the water vapor-saturated gas flowed at the outlet of the gas quencher 12.

For example, under the condition that the gas temperature of the introduced gas 11A in the present embodiment is 40° C., when the absorbent is not circulated at each stage as in the prior art, the gas temperature of the outlet gas 11C discharged from the top 14a is approximately 10° C. higher than the gas temperature of the introduced gas. Therefore, under such a condition, it is more advantageous to install the cooling part 55 in the first absorbent circulation line $L_{11}$ to prevent the temperature of the absorbent from rising, for increasing the $CO_2$ concentration in the absorbent.

Hereinafter, preferred test examples exhibiting effects of the separation flow ratio according to the present embodiment are described. The present invention is not limited to these examples. FIGS. 10 to 15 of the test examples illustrate examples aimed for gases with a $CO_2$ concentration of 3% or more.

Figure 10:
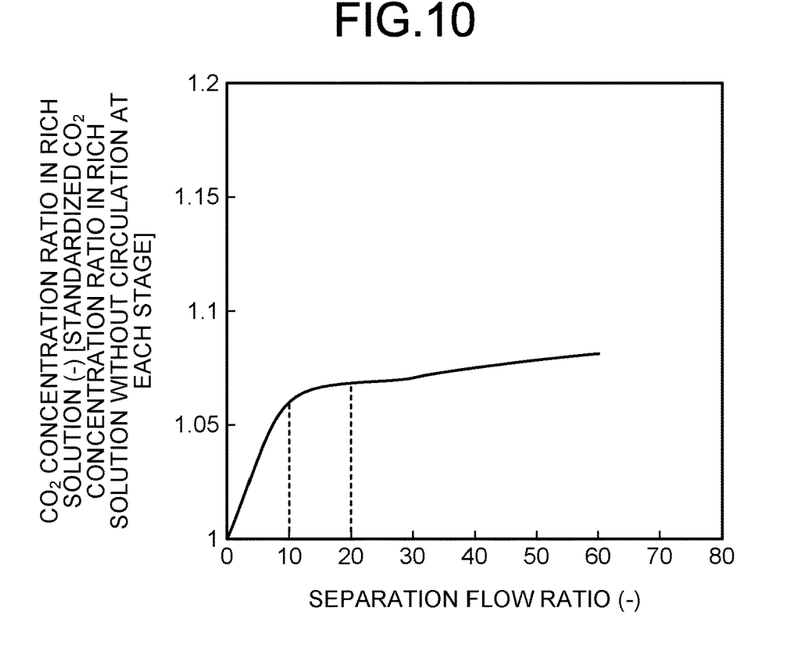
FIG. 10 is a graph representing $CO_2$ concentration ratios in a rich solution in test example 3.

FIG. 10 a graph representing $CO_2$ concentration ratios in the rich solution in test example 3. Herein, FIG. 10 represents a performance improvement ratio calculated based on standardized $CO_2$ concentration (1) without the discharge at each stage. In FIG. 10, the horizontal axis represents the separation flow ratio of the flow rate (f1) of the semi-rich solution 13B (circulation solution 13B) circulated through the first absorbent circulation line $L_{11}$ to the flow rate (f2) of the discharged solution 13B-1 supplied to the absorbent discharge line $L_{21}$, in the range of 1:1 to 60:1 (the same applies to FIGS. 11 and 12). The same applies to the separation flow ratio of the flow rate (f1) of the circulation solution 13C-1 circulated through the second absorbent circulation line $L_{12}$ to the flow rate (f2) of the rich solution 13C supplied to the rich solution supply line $L_1$, in the range of 1:1 to 60:1.

Figure 11:
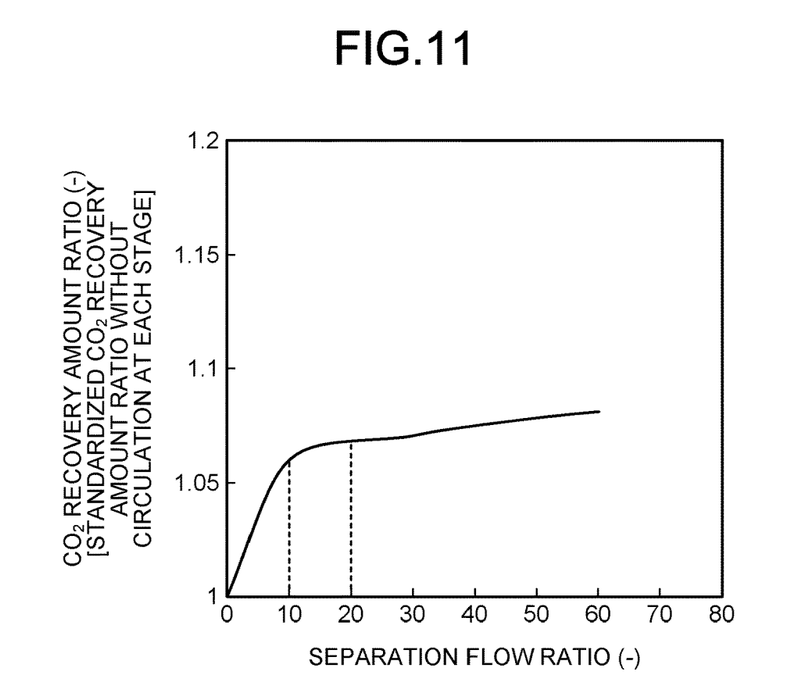
FIG. 11 is a graph representing $CO_2$ recovery amount ratios in test example 3.
Figure 12:
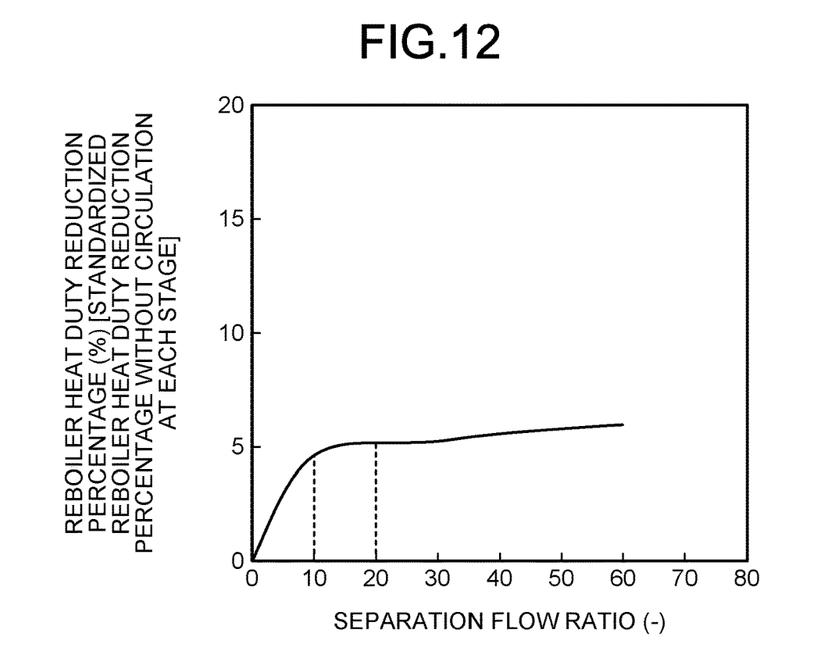
FIG. 12 is a graph representing reduction percentages (%) of reboiler heat duty in an absorbent regenerator in test example 3.
Figure 13:
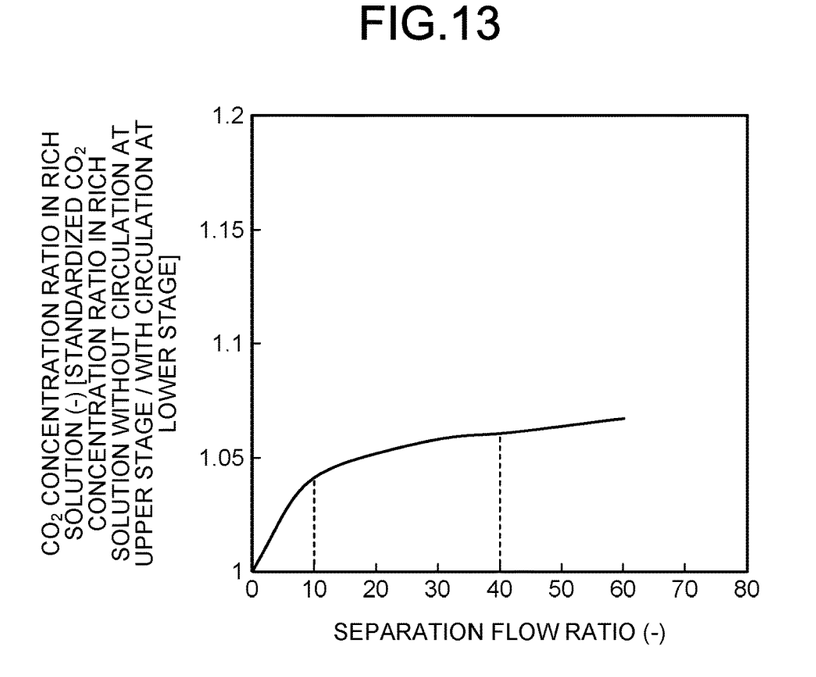
FIG. 13 is a graph representing $CO_2$ concentration ratios in a rich solution in test example 4.

FIG. 11 is a graph representing $CO_2$ recovery amount ratios in test example 3. Herein, FIG. 11 represents a performance improvement ratio calculated based on standardized $CO_2$ recovery amount (1) without the discharge at each stage. FIG. 12 is a graph representing reduction percentages (%) of reboiler heat duty in the absorbent regenerator in test example 3. FIG. 13 represents the reduction percentages (%) calculated based on standardized reboiler heat duty reduction percentages (0) without the discharge.

As illustrated in FIGS. 10 to 12, in test example 3, the separation flow ratio in the range of 1:1 to 60:1 allows for increase of the separation effects on the $CO_2$ concentration ratio in the rich solution, the $CO_2$ recovery amount ratio, and the reboiler heat duty reduction percentage (%). In particular, the separation flow ratio in the range of 1:1 to 20:1 allows for improvement in the increase ratio of the separation effects on the $CO_2$ concentration ratio in the rich solution, the $CO_2$ recovery amount ratio, and the reboiler heat duty reduction percentage (%).

Figure 14:
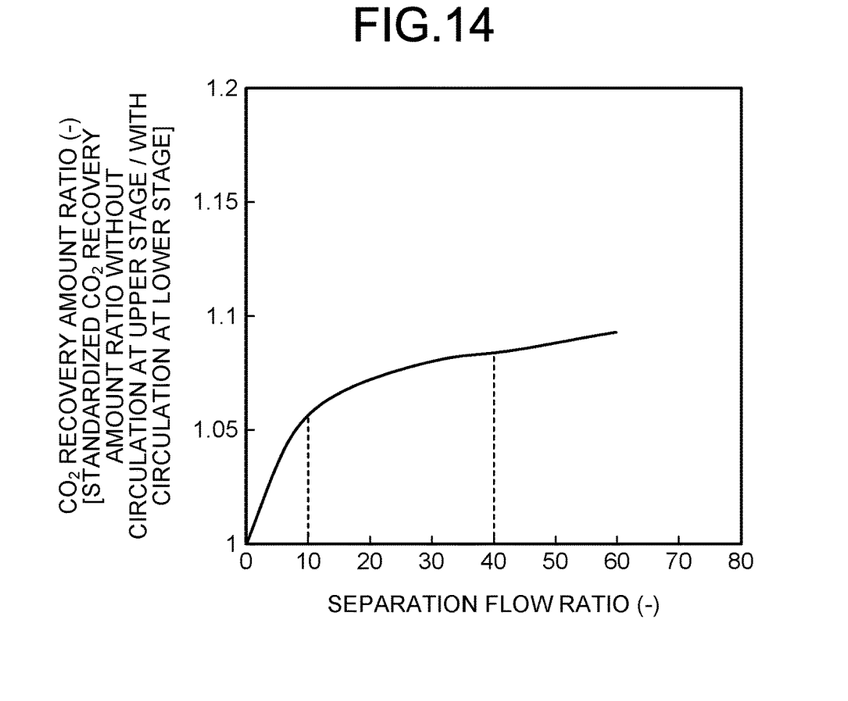
FIG. 14 is a graph representing $CO_2$ recovery amount ratios in test example 4.
Figure 15:
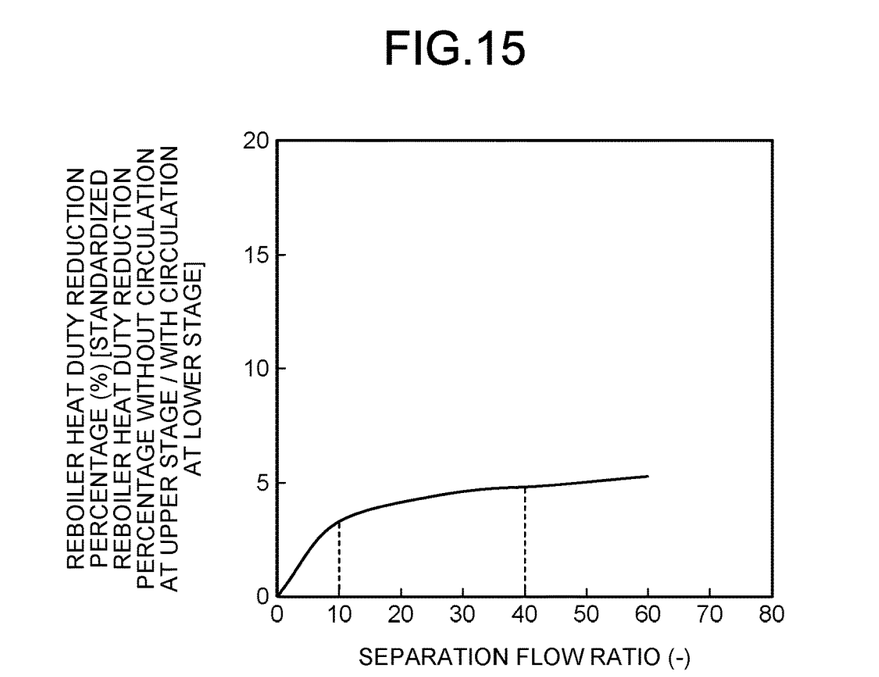
FIG. 15 is a graph representing reduction percentages (%) of reboiler heat duty in an absorbent regenerator in test example 4.

FIGS. 13 to 15 illustrate performances with comparison to the prior art (Patent Literature 2: International Publication No. 09/104744) in which only the second absorbent circulation line $L_{12}$ is used to circulate the absorbent, without the first absorbent circulation line $L_{11}$ installed as in the present invention, (with circulation at the lower stage without circulation at the upper stage) (Comparative Example 2).

FIG. 13 is a graph representing $CO_2$ concentration ratios in the rich solution in test example 4. Herein, FIG. 13 represents a performance improvement ratio calculated based on standardized $CO_2$ concentration (1) with circulation at the lower stage without circulation at the upper stage. In FIG. 7, the horizontal axis represents the separation flow ratio of the flow rate (f1) of the semi-rich solution 13B (circulation solution 13B) circulated through the first absorbent circulation line $L_{11}$ to the flow rate (f2) of the discharged solution 13B-1 supplied to the absorbent discharge line $L_{21}$, in the range of 1:1 to 60:1 (the same applies to FIGS. 14 and 15). The same applies to the separation flow ratio of the flow rate (f1) of the circulation solution 13C-1 circulated through the second absorbent circulation line $L_{12}$ to the flow rate (f2) of the rich solution 13C supplied to the rich solution supply line $L_1$, in the range of 1:1 to 60:1.

FIG. 14 is a graph representing $CO_2$ recovery amount ratios in test example 4. Herein, FIG. 14 represents the performance improvement ratio calculated based on standardized $CO_2$ recovery amount (1) with circulation at the lower stage without circulation at the upper stage. FIG. 15 is a graph representing reduction percentages (%) of reboiler heat duty in the absorbent regenerator in test example 4. FIG. 15 represents the reduction percentages (%) calculated based on standardized the reboiler heat duty reduction percentages (0) with circulation at the lower stage without circulation at the upper stage.

As illustrated in FIGS. 13 to 15, in test example 4, the separation ratio of the flow rates in the range of 1:1 to 60:1 allows for improvement of the separation effects on the $CO_2$ concentration ratio in the rich solution, the $CO_2$ recovery amount ratio, and the reboiler heat duty reduction percentage (%). In particular, the separation ratio of the flow rates in the range of 1:1 to 40:1 allows for improvement in the increase ratio of the separation effects on the $CO_2$ concentration ratio in the rich solution, the $CO_2$ recovery amount ratio, and the reboiler heat duty reduction percentage (%).

The $CO_2$ recovery unit and the $CO_2$ recovery method described in the embodiments are understood, for example, as follows.

The $CO_2$ recovery unit 10A, 10B, 10C according to a first aspect includes: the $CO_2$ absorber 14 configured to bring the introduced gas 11A having a low $CO_2$ concentration into countercurrent contact with the $CO_2$ absorbent and remove $CO_2$; the absorbent regenerator 15 configured for heat exchange between the rich solution 13C containing absorbed $CO_2$ and the vapor flowed from the reboiler 31 to regenerate the $CO_2$ absorbent; the rich solution supply line $L_1$ configured to discharge the rich solution 13C containing absorbed $CO_2$ from the bottom 14b of the $CO_2$ absorber 14 and supply the rich solution to the top side of the absorbent regenerator 15; and the lean solution supply line $L_2$ configured to discharge the lean solution 13A, which is obtained after releasing $CO_2$, from the bottom 15b of the absorbent regenerator 15, and supply it to the top side of the $CO_2$ absorber 14, in which the $CO_2$ absorber 14 has at least two or more $CO_2$ absorption stages 141A, 141B. The $CO_2$ recovery unit 10A further includes: the absorbent circulation lines $L_{11}$, $L_{12}$ configured to discharge the $CO_2$ absorbent from the lower sides of the $CO_2$ absorption stages 141A, 141B and supply the $CO_2$ absorbent as the circulating semi-rich solution 13B (circulation solution 13B) and the circulating rich solution 13C (circulation solution 13C-1) to the upper sides of the corresponding $CO_2$ absorption stages 141A, 141B that are used as the discharge stages; and the absorbent discharge lines $L_{21}$, $L_1$ configured to discharge parts of the semi-rich solution 13B (circulation solution 13B) circulation solution 13C-1 from the absorbent circulation lines $L_{11}$, $L_{12}$ and supply the solution as the discharged solutions 13B-1, 13C to adjacent stage immediately below the discharge stages.

This configuration enables it to discharge the $CO_2$ absorbent containing the absorbed $CO_2$ from the lower portion of each of the $CO_2$ absorption stages, supply it to the upper portion of the corresponding stage at which the $CO_2$ absorbent is discharged, and reuse the solution as the $CO_2$ absorbent for the purpose of recovering $CO_2$ in the gas, increasing the $CO_2$ concentration in the $CO_2$ absorbent, and reducing the reboiler heat duty needed for recovering $CO_2$ from a variety of gases with low $CO_2$ contents.

The $CO_2$ recovery unit 10A, 10B, 10C according to a second aspect is aimed for the introduced gas 11A with a $CO_2$ concentration of 10% by volume or less.

This configuration enables it to reduce the reboiler heat duty needed for recovering $CO_2$ from the introduced gas 11A with a $CO_2$ concentration of 10% by volume or less.

In the $CO_2$ recovery unit 10A, 10B, 10C according to a third aspect, the flow ratio is set at 1:1 to 60:1 for the separation ratio of the flow rates of the circulation solution 13B, 13C-1 to the discharged solution 13B-1, 13C.

With the separation ratio of the flow rates of the circulation solution 13B, 13C-1 to the discharged solution 13B-1, 13C ranging from 1:1 to 60:1 in this configuration, it is possible to reduce the reboiler heat duty needed for recovering $CO_2$ from a variety of gases with low $CO_2$ contents.

The $CO_2$ recovery unit 10B, 10C according to a fourth aspect is provided with the wash section 142 at the downstream side of gas flow in the $CO_2$ absorption section at the highest stage.

This configuration having the wash section 142 enables it to wash the outlet gas 11C with water, and thereby minimize the loss of the amine-based absorbent in the outlet gas 11C released outwardly.

The $CO_2$ recovery unit 10C according to a fifth aspect has the cooling part 55 in the first absorbent circulation line $L_{11}$.

With the cooling part 55 in the first absorbent circulation line $L_{11}$, this configuration enables it to prevent the temperature of the absorbent from increasing, achieving advantageous effects on the increase in the $CO_2$ concentration in the absorbent.

A $CO_2$ recovery method according to a sixth aspect includes: a $CO_2$ absorption step of bringing the introduced gas 11A having low $CO_2$ concentration into countercurrent contact with the $CO_2$ absorbent to remove $CO_2$; an absorbent regeneration step of performing the heat exchange between the rich solution 13C containing the absorbed $CO_2$ and the steam flowed from the reboiler 31 to regenerate the $CO_2$ absorbent; and a step of discharging the rich solution 13C containing $CO_2$ that is absorbed at the $CO_2$ absorption step, supplying it to the absorbent regeneration step, discharging the lean solution 13A that is obtained by releasing $CO_2$ at the absorbent regeneration step, and supplying it to the $CO_2$ absorption step to recover $CO_2$ in the gas. The $CO_2$ absorption step includes an absorbent circulation step of, in the $CO_2$ absorption section with at least two or more stages 141A, 141B, discharging the $CO_2$ absorbent from the lower sides of the $CO_2$ absorption stages 141A, 141B and then supplying it as the circulation solution 13B, 13C-1 to the upper sides of the corresponding $CO_2$ absorption stages 141A, 141B that are used for the discharge; and an absorbent discharge step of discharging a part of the circulation solution 13B from the absorbent circulation step and supplying it as the discharged solution 13B-1, 13C to the stage immediately below the stage used for the discharge.

This configuration enables it to discharge the $CO_2$ absorbent containing the absorbed $CO_2$ from the lower portion of each of the $CO_2$ absorption stages, supply it to the upper portion of the corresponding stage at which the $CO_2$ absorbent is discharged, and reuse the solution as the $CO_2$ absorbent for the purpose of recovering $CO_2$ in the gas, increasing the $CO_2$ concentration in the $CO_2$ absorbent, and reducing the reboiler heat duty needed for recovering $CO_2$ from a variety of gases with low $CO_2$ contents.

REFERENCE SIGNS LIST 10A to 10C $CO_2$ recovery unit
11A, 11B Introduced gas
11C Outlet gas
13A Lean solution
13B Semi-rich solution
13B-1 Discharged solution
13C Rich solution
13C-1 Circulation solution
14 $CO_2$ absorber
15 Absorbent regenerator
31 Reboiler
55 Cooling part
141A First $CO_2$ absorption stage (first absorption stage)
141B Second $CO_2$ absorption stage (second absorption stage)
144 Liquid reservoir
$L_1$ Rich solution supply line
$L_2$ Lean solution supply line
$L_{11}$ First absorbent circulation line
$L_{12}$ Second absorbent circulation line
$L_{21}$ Absorbent discharge line

The invention claimed is:

1. A $CO_2$ recovery unit comprising:
a $CO_2$ absorber that brings a gas having a low $CO_2$ concentration into countercurrent contact with a $CO_2$ absorbent to remove $CO_2$ from the gas;
an absorbent regenerator that performs a heat exchange between a rich solution containing absorbed $CO_2$ and water vapor flowed from a reboiler to regenerate the $CO_2$ absorbent;
a rich solution supply line that discharges a rich solution in which $CO_2$ has been absorbed by the $CO_2$ absorbent in the $CO_2$ absorber, from a bottom part of the $CO_2$ absorber and supplies the rich solution to an upper side of the absorbent regenerator; and
a lean solution supply line that discharges a lean solution in which $CO_2$ has been released from the rich solution in the absorbent regenerator, from a bottom part of the absorbent regenerator and supplies the lean solution as the $CO_2$ absorbent to an upper side of the $CO_2$ absorber,
wherein the $CO_2$ absorber includes at least two or more $CO_2$ absorption sections including a first $CO_2$ absorption section and a second $CO_2$ absorption section located below the first $CO_2$ absorption section, and
the $CO_2$ recovery unit further comprises:
a first absorbent circulation line that discharges the $CO_2$ absorbent from the first $CO_2$ absorption section and supplies the $CO_2$ absorbent as a first circulation solution to an upper side of the first $CO_2$ absorption section;
a second absorbent circulation line that discharges the $CO_2$ absorbent from the second $CO_2$ absorption section and supplies the $CO_2$ absorbent as a second circulation solution to an upper side of the second $CO_2$ absorption section; and
an absorbent discharge line that discharges a part of the first circulation solution from the first absorbent circulation line and supply the part of the first circulation solution as a discharged solution to the second absorbent circulation line.

2. The $CO_2$ recovery unit according to claim 1, wherein the gas has a $CO_2$ concentration of 10% by volume or less.

3. The $CO_2$ recovery unit according to claim 1, wherein a separation ratio of flow rates of the first circulation solution to the discharged solution is set to 1:1 to 60:1.

4. The $CO_2$ recovery unit according to claim 1, further comprising a water wash section on a downstream side of a gas flow in the first $CO_2$ absorption section.

5. The $CO_2$ recovery unit according to claim 1, wherein the first absorbent circulation line includes a cooling part.

6. A $CO_2$ recovery method comprising:
a $CO_2$ absorption step of bringing a gas having a low $CO_2$ concentration into countercurrent contact with a $CO_2$ absorbent to remove $CO_2$ from the gas;
an absorbent regeneration step of performing a heat exchange between water vapor and a rich solution containing absorbed $CO_2$ to regenerate the $CO_2$ absorbent; and
a step of discharging a rich solution in which $CO_2$ has been absorbed at the $CO_2$ absorption step, supplying the rich solution to the absorbent regeneration step, discharging a lean solution in which $CO_2$ has been released from the rich solution at the absorbent regeneration step, and supplying the lean solution as the $CO_2$ absorbent to the $CO_2$ absorption step to recover $CO_2$ in the gas,
wherein the $CO_2$ absorption step includes at least two or more $CO_2$ absorption steps including a first $CO_2$ absorption step and a second $CO_2$ absorption step following the first $CO_2$ absorption step,
the $CO_2$ recovery method further comprises:
a first absorbent circulation step of discharging the $CO_2$ absorbent obtained at the first $CO_2$ absorption step and supplying the $CO_2$ absorbent as a first circulation solution to the first $CO_2$ absorption step;
a second absorbent circulation step of discharging the $CO_2$ absorbent obtained at the second $CO_2$ absorption step and supplying the $CO_2$ absorbent as a second circulation solution to the second $CO_2$ absorption step; and
an absorbent discharge step of discharging a part of the first circulation solution obtained at the first absorbent circulation step and supplying the part of the first circulation solution as a discharged solution to the second absorbent circulation step.

* * * * *